United States Patent [19]

St. Clair

[11] Patent Number: 4,783,048
[45] Date of Patent: Nov. 8, 1988

[54] SLIDE GATE DAMPER SYSTEM

[76] Inventor: Thomas W. St. Clair, 2119 Cathedral Ave., Cincinnati, Ohio 45212

[21] Appl. No.: 134,194

[22] Filed: Dec. 17, 1987

[51] Int. Cl.⁴ .............................................. F16K 31/05
[52] U.S. Cl. .......................... 251/129.11; 251/129.04; 251/326
[58] Field of Search ...................... 251/129.11, 129.12, 251/129.13, 326, 329, 129.04; 160/310, 311

[56] References Cited

U.S. PATENT DOCUMENTS

| | | | |
|---|---|---|---|
| 1,483,041 | 2/1924 | Brooks | 251/326 X |
| 1,682,206 | 8/1928 | Whitcomb, Jr. et al. | 251/326 X |
| 1,694,431 | 12/1928 | Russell et al. | 49/358 |
| 1,881,016 | 10/1932 | Rose | 49/358 X |
| 1,952,681 | 3/1934 | Peelle | 49/358 |
| 2,292,262 | 8/1942 | Alter | 251/326 X |
| 2,310,678 | 2/1943 | Crew et al. | 251/129.11 |
| 2,847,179 | 8/1958 | Payzer et al. | 251/129.13 |
| 3,257,756 | 6/1966 | Mealer | 49/264 |
| 3,897,932 | 8/1975 | Hale | 251/129.11 |
| 4,253,483 | 3/1981 | Cornelius | 251/329 X |
| 4,582,296 | 4/1986 | Bachmann | 251/326 |
| 4,666,270 | 5/1987 | Hager | 251/326 |
| 4,700,927 | 10/1987 | Henderson | 251/329 X |

Primary Examiner—John Rivell
Attorney, Agent, or Firm—Charles R. Wilson

[57] ABSTRACT

A slide gate damper system comprises (a) a duct frame adapted for mounting in a duct, (b) a gate support frame mounted outside the duct in association with the duct frame; (c) guide rails positioned on the frame members of the gate support frame, (d) a slide gate positioned within the gate support frame, (e) a power source mounted on the slide gate and movable therewith and (f) a drive mechanism operatively connecting the power source to the gate support frame. Mounting of the power source on the slide gate and adapting the drive mechanism accordingly results in a slide gate damper system with reduced overall weight and support structure.

12 Claims, 5 Drawing Sheets

SLIDE GATE DAMPER SYSTEM

This invention relates to a slide gate damper system. More particularly, the invention relates to a slide gate damper system wherein a power source is mounted on the slide gate with the system having reduced overall weight, support structure and drive components.

BACKGROUND OF THE INVENTION

Ducts are found extensively in commercial and industrial buildings. Ducts are used for conveying heated air and toxic gases as a part of many power plants' electricity generating systems. They are also used for directing the flow of gases in many industrial processes. A necessary part of such ducts is the provision of dampers for regulating and isolating the flow of air and other gases through the ducts. There are various types of dampers. One widely used damper is commonly referred to as a slide gate damper. These dampers have gates which are essentially flat surfaces. The gates function by sliding in a track from outside a duct, through the duct wall, and into the duct passageway. Such dampers are used in ducts having cross surface areas ranging from about one square foot to about 500 square feet.

Gates on the dampers can be manually operated, though, because of their size and placement, are normally provided with a power source. A power source such as a electric motor with a drive mechanism is associated with the gate to open or close the gate in response to a command. The power source and drive mechanism for many slide gates require extensive mechanical drive components. Additionally, sufficient space must be allowed for all the necessary components to connect the power source to the gate. The resultant support frames, power source and drive mechanisms are very heavy overall.

There has now been developed an opening and closing system for slide gate dampers which requires a minimum of support structure. The motor and drive mechanism of the system make use of known dampers with a minimum of structural change required.

SUMMARY OF THE INVENTION

A slide gate damper system has reduced overall weight and support structure for use in ducts. The system comprises (a) a duct frame adapted for mounting in a duct, (b) a gate support frame mounted outside the duct in association with the duct frame (c) guide rails positioned on substantially parallel members of the gate support frame (d) a slide gate positioned within the gate support frame and dimensioned to ride along the guide rails, (e) a power source and (f) a drive mechanism. The power source is mounted on the slide gate for movement therewith. The drive mechanism associated with the power source and the gate support frame causes movement of the slide gate along the guide rails to varying positions.

DETAILED DESCRIPTION OF THE INVENTION

Figure 1:
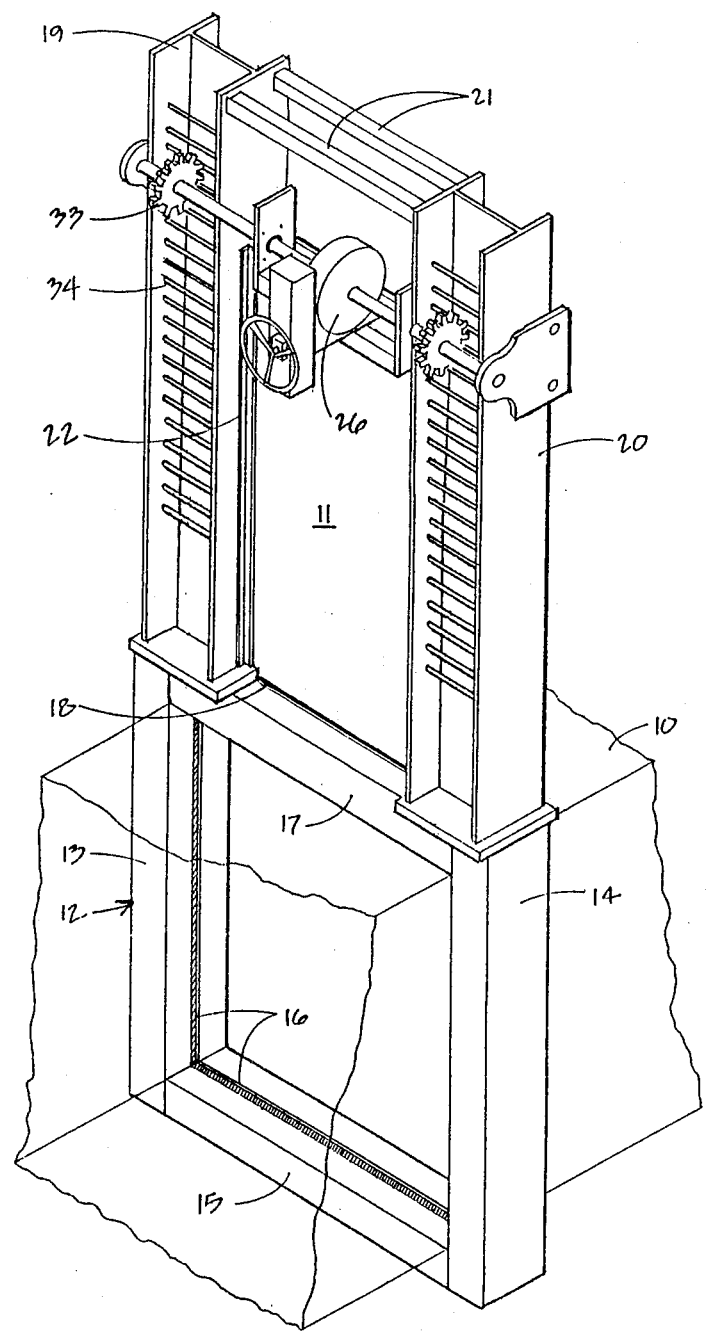
FIG. 1 is a perspective view of a duct partially cut away to show the slide gate damper system of this invention.

The invention described herein is made with particular reference to the drawings. Referring to FIG. 1, there is shown duct 10 with a slide gate 11. A duct frame shown generally as 12 for receiving slide gate 11 is positioned in the duct. Members 13, 14 and 15 of the duct frame have recesses 16 which are positioned to accommodate the slide gate as it descends into the duct. Frame member 17 and a like member behind the slide gate each extend across the top of the duct with a slot 18 through which passes the slide gate when opened or closed. The duct frame is secured to the walls of the duct in a conventional fashion e.g., bolts typically extend through the frame members into the duct's walls. If required, zero leak means can also be provided to ensure that unwanted leakage does not occur. Ducts with such a frame and slide gate provided with zero leak means are well known.

Substantially parallel gate support members 19 and 20 in the form of I-beams are mounted on opposite sides of the frame member 18 and extend beyond the duct's outer surface. Cross support members 21 are provided for stability reasons. The slide gate 11 is dimensioned to fit within the parallel support members and is capable of moving up or down along guide rails 22 upon command. The guide rails 22 found on gate support frame members 19 and 20 are for the purpose of guiding the slide gate during any movement. The guide rails are secured along the inside surfaces of the gate support members for essentially the whole length. Conventional fastening members such as welds, screws and bolts maintain the guide rails in place.

In accordance with the invention, a power source is mounted on the slide gate. Power sources primarily include electric motors with appropriate gear reduction means. Electric motors are highly preferred because of their ease of operation. The power source is mounted to allow the slide gate to move to a fully open or fully closed position. The power source can be bolted directly to the slide gate or bolted to support brackets and braces mounted on the slide gate. As evident from FIG. 2, support bracket 25 is bolted to a face of the slide gate near the gate's top edge. An electric motor 26 and gear reduction means 27 are securely attached to bracket 25. Drive shaft 28 extends from the gear reduction means of the motor towards each side edge of the slide gate. The drive shaft passes through braces 29 and bearing supports 30. Preferably, the top edge of the slide gate is cut-away to accommodate the power source 26 with an overall reduction in height of the system. The electric motor is fed by an electric line (not shown). Provision is made in a known manner to ensure the electric line is maintained a safe distance from any possible pinch points.

An important feature of this invention is the positioning of the power source on the slide gate to move therewith. Placement of the power source on the slide gate itself simplifies the support structure and drive mechanism of the total system. Necessarily, the slide gate is a substantial structure often built to handle hot gases flowing at high speeds. A tremendous force is exerted against the slide gate. Using the slide gate to hold the power source eliminates a need to position it elsewhere with additional drive components, for the power source. The result is a damper system wherein the slide gate is more fully utilized with a consequent reduction in framing and hardware components to move the slide gate. An added benefit is the compactness of the total damper system.

Figure 2:
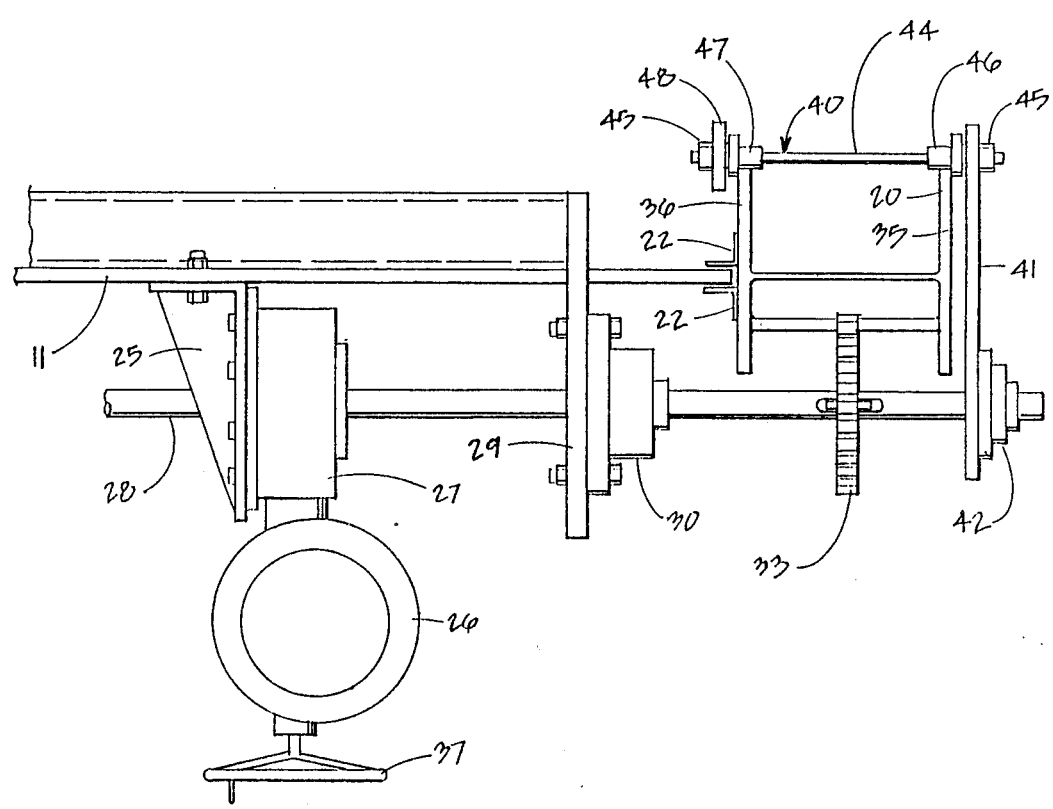
FIG. 2 is a partial top view of the slide gate damper system of FIG. 1 showing the drive mechanism.

Any drive mechanism which operably connects the power source to the immovable gate support members to cause movement of the slide gate is used. Preferred are gear wheels 33 mounted on each end of the drive shaft 28 and a cooperatively acting member fixedly mounted on the gate support members 19 and 20. The cooperatively acting member depicted in FIGS. 1 and 2 is a series of cross pins 34 spaced vertically along the gate support members to match with the teeth of the gear wheels as they revolve. The cross pins are fixed to side members 35 and 36 of the I-beam gate support members. Thus, actuation of the electric motor causes the drive shaft 27 to turn the gear wheels 33. The meshing of the teeth of the gear wheels with the cross pins 34 causes the slide gate to move along the guide rails until the desired gate position is achieved.

The power source is reversible, responsive to signals to either move the slide gate into or out of the duct to effect closing or opening of the duct. Stop limits are provided to prevent the slide gate from moving too far. Additionally, a manual means such as hand wheel 37 and worm gear are provided with the system as an emergency measure to move the gate in case of a power failure or other mechanical failure.

Figures 3, 4:
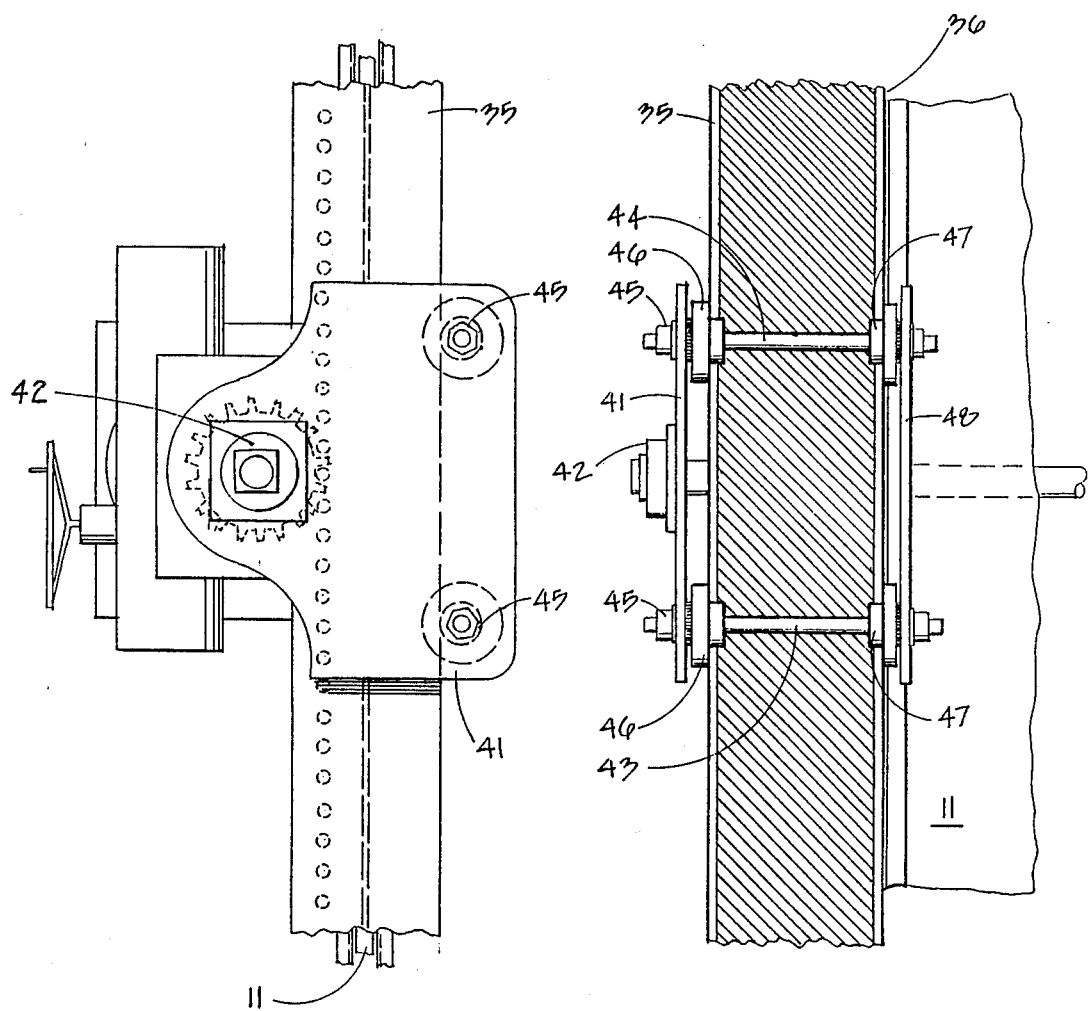
FIG. 3 is a side view of a roller lock mechanism found on the slide gate damper system of FIG. 1.
FIG. 4 is a back view of the roller lock mechanism of FIG. 3.

A roller lock mechanism shown generally as 40 is best depicted in FIGS. 2-4. The lock mechanism is intended as a means to securely hold the gear wheels 33 and cross pins 34 in mesh. In effect, this ensures that the slide gate will not inadvertantly slip off the cross-pins during operation. The lock mechanism comprises a plate 41 with a hole in one end to receive the end of the drive shaft 28. A bearing 42 is fitted in the plate hole to accommodate the drive shaft. An opposite side of the plate has two axles 43 and 44 secured in bearings 45 thereon and extending completely across the gate frame member 20. Rollers 46 are positioned to ride along the outside surface of side member 35 while rollers 47 are positioned to ride along the outside surface of side member 36 of the gate support member. Recessed portions of the rollers ride along the side members 35 and 36 for ease of operation of the lock mechanism. Brace 48 provides lateral movement stability for the lock mechanism. Still added stability is provided by substitution of the brace 48 with a plate which fixedly receives the axles 43 and 44 and the drive shaft 28.

Figure 5:
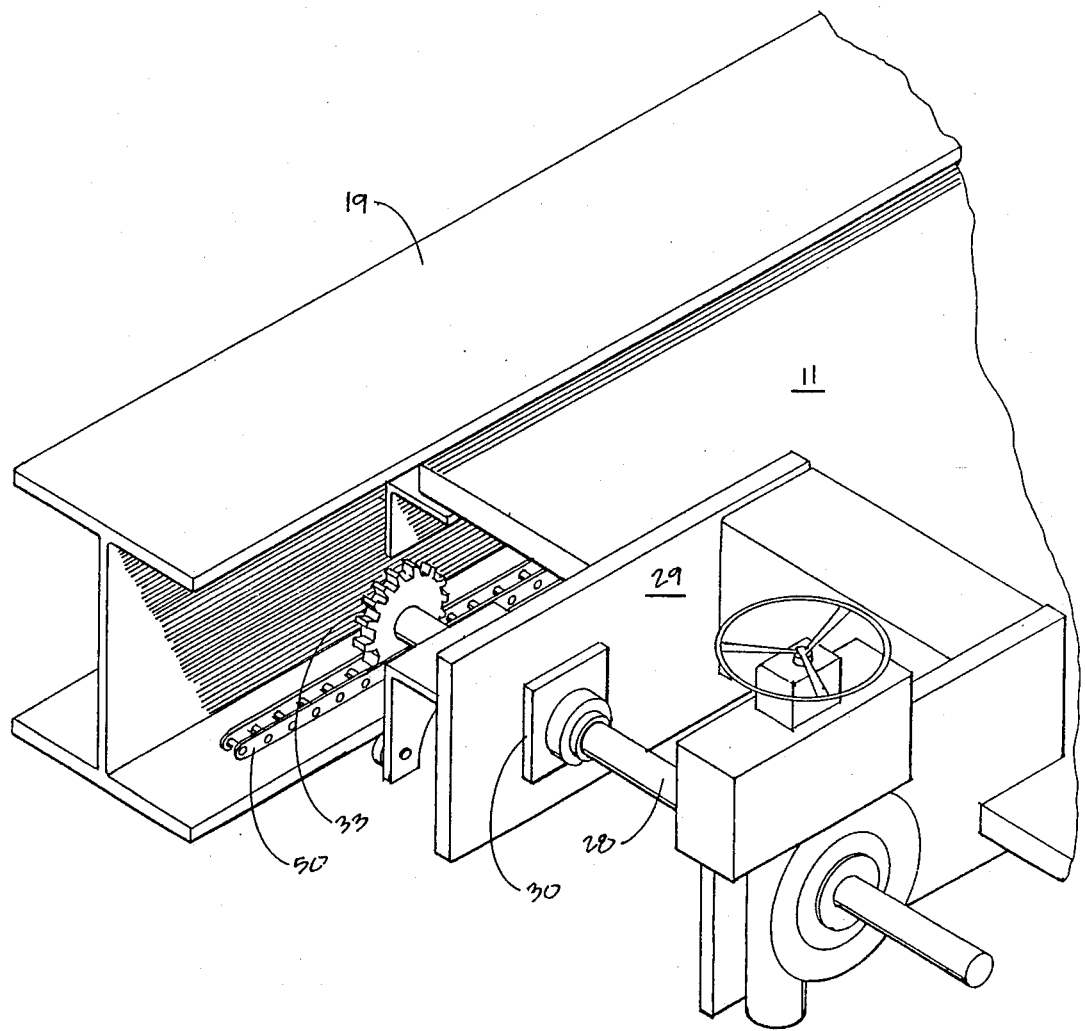
FIG. 5 is a partial view in perspective showing an alternative drive mechanism based on a gear wheel and chain drive.

FIG. 5 shows an alternative drive mechanism to be used in place of that depicted in FIGS. 1-4. A sprocket chain 50 is bolted at least on each end directly to an inside surface of the gate support member 19. One end of the chain is bolted with an adjustable take-up to accommodate any chain stretching over extended use. Individual links 51 receive the gear wheel teeth as it revolves. In this embodiment of the invention, guide rails 22 are positioned on each of the two parallel gate support frame members 19 and 20.

Figure 6:
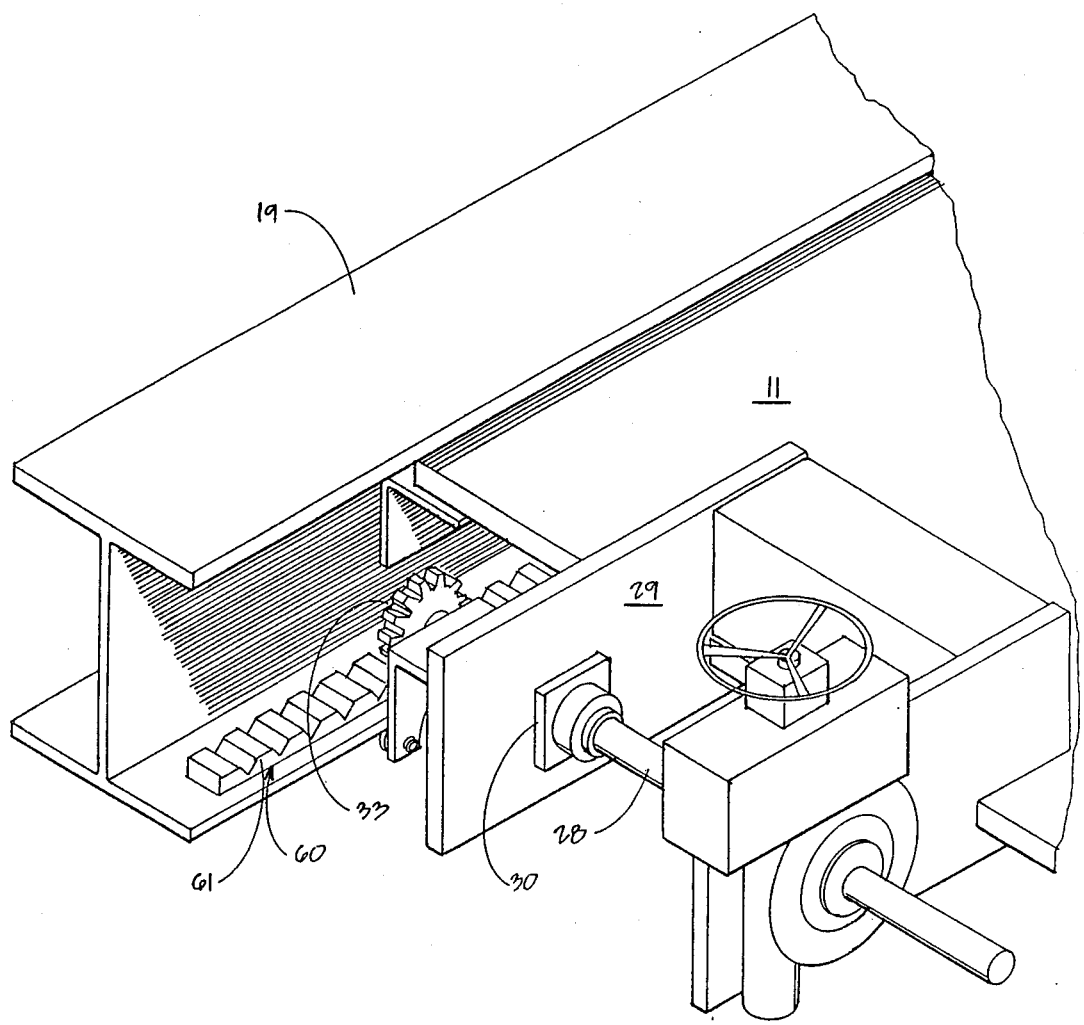
FIG. 6 is a partial view in perspective showing another drive mechanism based on a rack and pinion drive system.

Another drive system shown in FIG. 6 utilizes a rack and pinion system. In this embodiment of the invention, the rack 60 is positioned on the gate support member 19. Individual members 61 of the rack are in mesh with the gear wheel teeth to cause movement of the slide gate in a manner similar to the system described with reference to FIG. 5.

In operation, actuation of the power source will cause the power source's drive shaft to revolve. The power from the drive shaft is transferred to the gear wheels. Cooperatively acting members on the system's gate support frame are in mesh with the revolving gear wheels. As the gear wheels revolve, the gear teeth mesh with the cooperatively acting members and move along them to cause the slide gate to open or close. Reversing the power source causes the slide gate to move in the other direction.

Obvious modifications may be made to the invention described herein. For example, a single vertical support member can be positioned laterally at approximate midpoint on the gate support frame. The cooperatively acting member of the drive system is associated with this vertical support member. All such obvious modifications and variations are within the scope of the invention.

What is claimed is:

1. A slide gate damper system having reduced overall weight, support structure and drive components for use in a duct, comprising:
    (a) a duct frame adapted for mounting in the duct with means to receive a slide gate;
    (b) a gate support frame mounted outside the duct in association with the duct frame;
    (c) guide rails positioned on substantially parallel members of the gate support frame;
    (d) a slide gate positioned within the gate support frame such that it will ride along the guide rails;
    (e) a power source mounted on the slide gate and movable therewith; and
    (f) a drive mechanism operably connecting the power source to the gate support frame such that actuation of the power source causes the slide gate to move along the guide rails to effect an opening or closing of the duct.

2. The system of claim 1 wherein the power source comprises an electric motor.

3. The system of claim 2 wherein the drive mechanism comprises a gear wheel mounted on at least one end of a drive shaft and a cooperatively acting member associated therewith on the gate support frame so that force from the electric motor is transferred to the gear wheel which in turn moves the slide gate along the cooperatively acting member.

4. The system of claim 3 wherein the drive mechanism comprises pinion gear wheels on each end of the drive shaft and racks mounted along parallel gate support frame members.

5. The system of claim 3 wherein the drive mechanism comprises gear wheels on each end of the drive shaft and a sprocket chain mounted along the substantially parallel members of the support frame.

6. The system of claim 3 wherein the drive mechanism comprises gear wheels mounted on the ends of the drive shaft and I-beams as the gate support frame with means to cooperatively receive the teeth of the gear wheels.

7. The system of claim 6 wherein the I-beams have cross-pins along which the gear wheels are able to advance.

8. The system of claim 1 further comprising stops to limit movement of the slide gate.

9. The system of claim 1 wherein the power source is reversible with actuating switch means.

10. The system of claim 1 wherein the duct is used for conveying gaseous material.

11. The system of claim 7 further comprising a roller lock mechanism to maintain the gear wheels in working relationship with the cooperatively acting members.

12. The system of claim 11 wherein the roller lock mechanism comprises a plate secured to the drive shaft at one end with a pair of rolling guide means secured to the plate such that a roller of each guide means rolls along an outside surface of the gate support frame member and another roller of each guide means rolls along an opposite outside surface of the gate support frame member as the slide gate moves.

* * * * *